June 18, 1946.   J. W. HALE   2,402,248
CHANGE SPEED DEVICE
Filed Nov. 17, 1942
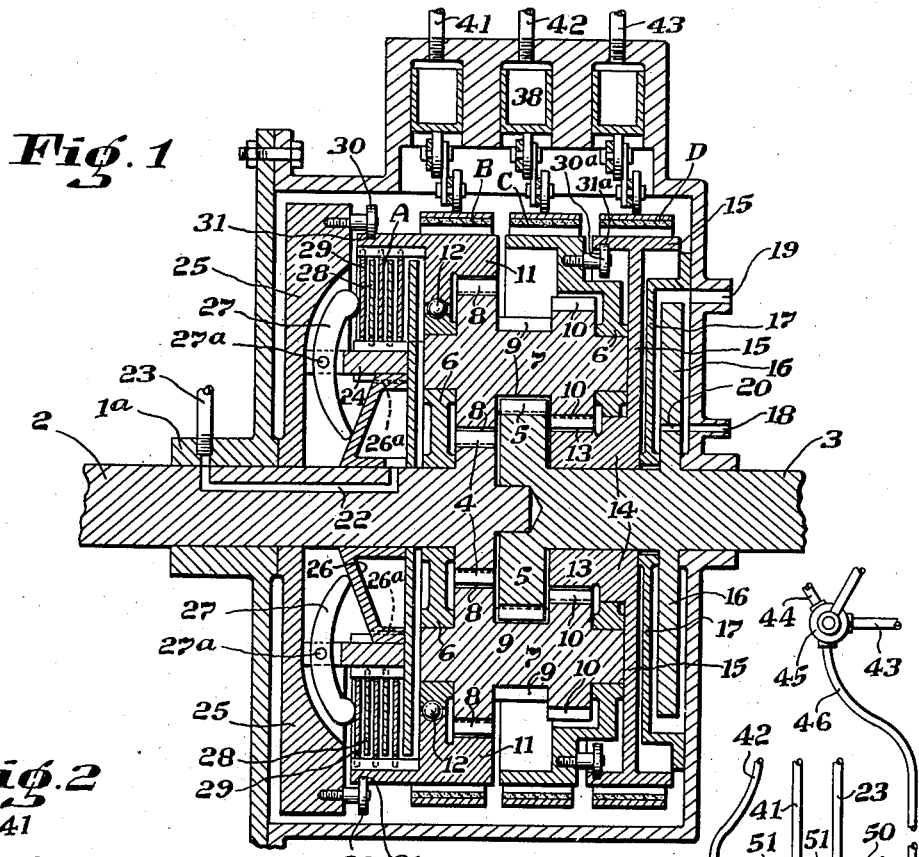
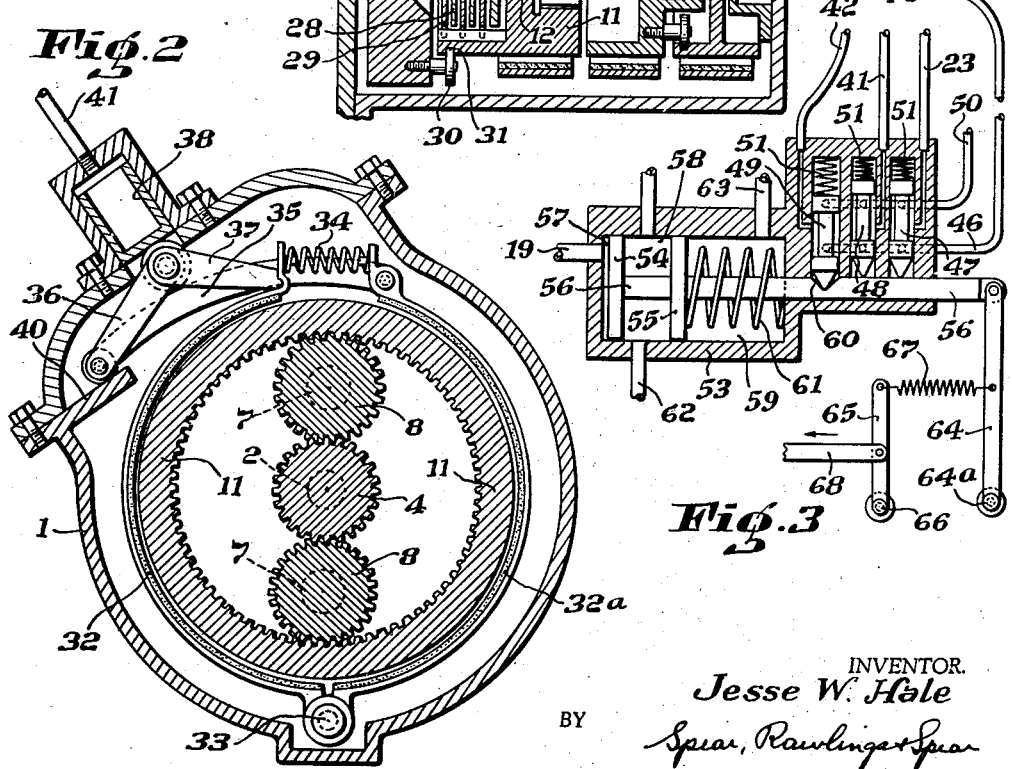
INVENTOR.
Jesse W. Hale
BY
Spear, Rawlings & Spear
ATTORNEY.

Patented June 18, 1946

2,402,248

UNITED STATES PATENT OFFICE 2,402,248

CHANGE-SPEED DEVICE

Jesse W. Hale, Weston, Mass.

Application November 17, 1942, Serial No. 465,855

10 Claims. (Cl. 74—260)

My present invention relates to change speed devices an dautomatic controls therefor and is a refile of application, Serial No. 317,926, now abandoned.

In accordance with my invention, the drive and driven shafts are coupled by step gears carried by a reactor, and the reactive speed of the reactor is controlled by other reactors driven by the step gears.

Means are employed to hold each reactor against rotation and to couple one of the reactors to one of the shafts to establish suitable forward speeds and a reverse drive.

The brakes and the clutch are operated by fluid pressure and I have provided novel means for automatically controlling their operation, including fluid pressure, responsive to the speed of the driven shaft supplemented by either or both intake and exhaust pressures, and opposed by resilient means, the resistance of which may be varied with the position of the throttle.

In the accompanying drawing I have illustrated embodiments of my invention from which its features and advantages will be readily apparent. In the drawing:

Fig. 1 is a longitudinal sectional view of my change speed device.

Fig. 2 is a section of Fig. 1 showing one of the brakes, and

Fig. 3 shows the automatic control mechanism for the fluid pressure delivery means employed to actuate the clutch and the brakes.

In the drawing I have shown a housing I having aligned ports for the drive shaft 2 and the driven shaft 3. Bushings and the like are omitted to simplify the drawing.

The drive shaft 2 and the driven shaft 3 carry gears 4 and 5, respectively. A cage 6 rotatable independently of the shafts 2 and 3 carries idler gears 7 having steps 8, 9 and 10. The step 8 is in mesh with the drive shaft gear 4 and with the independently rotatable reactor 11 supported by the cage 6 by ball bearings 12 to permit the reactor 11 to be independently rotatable.

The step 9 is in mesh with the driven shaft gear 5 and the step 10 is in mesh with a gear 13 carried by the sleeve 14 rotatable independently of the driven shaft 3. The sleeve 14 carries the flanged disc 15.

Between the flanged disc 15 and the rear of the housing I, I provide an impeller 16 carried by the driven shaft 3 and rotatable within the chamber defined by the rear wall of the housing I and the chamber wall 17.

An oil inlet is indicated at 18 supplying lubricant from a source of supply such as the crank case (not shown). A discharge or outlet conduit is shown at 19, and at 20 I have indicated an aperture through the impeller blade 16. It will be noted that the chamber wall 17 is spaced slightly from the shaft 3 to establish a clearance through which oil may escape into the casing I.

At 22 I have indicated a conduit extending through the shaft 2 in communication with the inlet conduit 23 through the casing hub 1a and the cylinder 24 which may be carried by the fly wheel 25 on the shaft 2. A piston 26 slidably splined to the cylinder 24 as at 26a is adapted to actuate the levers 27 pivotally mounted at 27a in slots in the front portion of the cylinder 24.

The heads of the levers 27 are adapted to carry into engagement the clutch plates 28 and 29 slidably carried by the cylinder 24 and the reactor 11, respectively. The clutch plates 28 and 29 establish the clutch A by which the reactor 11 is rotated with the drive shaft 2 to establish direct drive.

At B, C and D I have indicated generally brake means to hold the reactor 11, the cage 6, and the disc 15 against rotation. The brake means and the control mechanism will be described after the operation of the device set forth has been explained.

Assuming that the clutch A and the brake means B, C and D are not engaged and that there is a load on the driven shaft 3, rotation of the drive shaft 2 will cause retrograde rotation of the cage 6, the reactor 11, and the disc 15.

When the brake C is engaged, the cage 6 is held against rotation and the driven shaft 3 is rotated at a ratio established by the gears 4, 5, 8 and 9. When the brake B is engaged to hold the reactor 11 against rotation, the cage 6 is rotated in the direction of the shafts 2 and 3 to establish a suitable second speed, and when the clutch A is engaged to couple the reactor 11 to the drive shaft 2, the shafts 2 and 3 rotate together establishing a direct drive.

When the brake D is engaged, the step 10 travels around the gear 13 and because of the selected ratio of these gears, the shaft 3 is rotated by the gear 9 to establish a suitable reverse drive.

While the reactor 11 is maintained in proper alignment by the ball bearings 12, I have shown rollers 30 and 30a carried by the fly wheel 25 and the cage 6, respectively, to travel in annular grooves 31 and 31a on the reactor 11 and the flanged disc 15, respectively.

The clutch A and its operating mechanism are shown in detail. In Fig. 2, the brake B is shown and it will be appreciated that the brakes C and D are identical. The brake actuating mechanism may be of the type shown in my prior Patent No. 2,222,813, of November 26, 1940. Such apparatus consists of a pair of brake members 32 and 32ª pivoted as at 33 and normally held in an inoperative position by the spring 34.

Toggle mechanism to actuate the brake member consists of an arm 35 connected to the free end of the brake member 32ª, and arm 36 pivotally connected to the free end of the first arm 35 and to a third arm 37 in control of the free end of the brake member 32. A piston 38 to actuate the toggle mechanism is mounted in a cylinder 29. The free end of the toggle mechanism is supported as at 40.

As the operating means for the brakes B, C, and D are identical, I have distinguished between them by indicating the supply conduits for the brakes B, C. and D, as 41, 42, and 43, respectively.

The supply of fluid pressure may be the crank case and the supply conduit 44 is controlled by a manually operable two-way valve 45 to deliver fluid through the conduit 43 to operate the brake D or through the conduit 46 to the valve assembly including the valves 47, 48, and 49.

The valves 47, 48 and 49 are identical and each is adapted to connect the pressure operable means of a brake or a clutch to the supply conduit 46 or the return conduit 50. Each of the valves is under the influence of a spring 51 and formed with a pointed end. The valve 47 controls the pressure flow to the clutch A through the conduit 23 while the valves 48 and 49 control the pressure flow to the brakes B and C, respectively, through the conduits 41 and 42.

At 53 I have shown a cylinder in which a pair of pistons 54 and 55 carried by a rod 56 establish chambers 57, 58 and 59. The rod 56 has a notch 60 to receive the pointed ends of the valves 47, 48, and 49 to permit their successive movement by their springs from an inoperative to an operative position.

The conduit 19 from the impeller 16 enters one end wall of the cylinder 53 so that fluid under pressure, responsive to the speed of the driven shaft, is effective to actuate the rod 56. Movement of the rod 56 by fluid under pressure is opposed by a spring 61 in the chamber 59.

I have provided conduit 62 to return any fluid leaking by the piston 54 to its source. At 63 I have shown a conduit that may be connected to make either intake or exhaust pressures available to cooperate with the fluid pressure in actuating the valve control in relation to driven shaft speeds and engine loads.

Movement of the rod 56 may also be opposed by a lever 64 pivotally attached thereto and pivoted as at 64ª. A second lever 65 pivoted as at 66 is connected to the lever 64 by a spring 67. The lever 65 carries a link 68 adapted to be connected for movement with the throttle so that as the throttle is opened, the resistance to movement of the rod 56 is increased.

The operation of my device depends on the position of the valve 45 which controls either forward or reverse drive. Assuming the valve 45 to be positioned to admit fluid pressure through the conduit 43, the brake D is actuated to hold the reactor D against rotation to establish reverse rotation of the driven shaft 3. When the valve 45 is positioned to admit fluid pressure to the valve control, the operation of my device may be most readily understood by assuming a position of the rod 56 permitting the valve 49 to admit fluid through the conduit 42 to actuate the brake C to hold the reactor 6 against rotation establishing a low speed connection between the shafts 2 and 3.

As the fluid pressure in the conduit 19 increases with the speed of the driven shaft, the spring 61 is overcome to permit the valves 48 and 47 to be successively opened to permit the fluid pressure to actuate respectively the brake B and the clutch A. When the brake B is engaged, the reactor 11 is held against rotation establishing a gear ratio suitable for a second speed and when the clutch A is engaged, a direct drive is established.

The actuation of the valves by the impeller generated pressures, in accordance with my invention, is coordinated with controls indicative of the load on the prime mover. The position of the throttle determines the extent to which the spring 67 cooperates with the spring 61 in opposing the operation of the valve control by fluid pressure.

I also provide means by which either intake or exhaust pressures may be employed. Assuming the conduit 63 to be connected to the intake, manifold pressure decreases as the torque decreases enabling the fluid pressure more readily to overcome the spring 61. Where the conduit 63 is connected to communicate exhaust pressures to the chamber 59, the pressures communicated obviously increase with the engine load retarding the action of the fluid under pressure against the piston 54. I am thus able to provide an operating control that permits gear ratio changes to be established automatically in relation to the torque.

What I therefore claim and desire to secure by Letters Patent is:

1. A change speed device comprising a drive shaft, a driven shaft, means including step gears connecting said shafts, a reactor carrying said step gears and rotatable independently of said shafts, fluid pressure operable means to hold said reactor against rotation for a low speed, a second reactor rotatable by said step gears, said second reactor when restrained being adapted to rotate said first reactor forwardly for a second ratio, fluid pressure operable means to hold said second reactor against rotation, and fluid pressure operable means to connect said drive shaft and said second reactor to establish a direct drive, fluid delivery means including a fluid pressure operated valve control to deliver fluid under pressure separately to said fluid pressure operable means, means to operate said valve control, said last named means comprising a source of fluid and means to deliver fluid from said source to said valve control under pressures responsive to the speed of said driven shaft, and means to deliver fluid pressure to said valve control at a pressure indicative of the engine load.

2. A change speed device comprising a drive shaft, a driven shaft, step gears connecting said shafts, a reactor carrying said step gears and rotatable independently of said shafts, means to hold said reactor against rotation for a low speed, a second reactor rotatable by said step gears, said second reactor when restrained being adapted to rotate said first reactor forwardly for a second ratio, means to hold said second reactor against rotation, means to connect said drive shaft and said second reactor to establish a direct drive, means including a control to operate said means, means to actuate said control, said actuating means comprising a pressure operable member, means driven by said driven shaft delivering pressure to said pressure operable member proportionate to the speed of said driven shaft, means resiliently opposing operation of said pressure operable member, and a source of power responsive to variations in motor pressure to cooperate with said pressure delivery means in the control of said member.

3. A change speed device comprising a drive shaft, a driven shaft, step gears connecting said shafts, a reactor carrying said step gears and rotatable independently of said shafts, means to hold said reactor against rotation for a low speed, a second reactor rotatable by said step gears, said second reactor when restrained being adapted to rotate said first reactor forwardly for a second ratio, means to hold said second reactor against rotation, means to connect said drive shaft and said second reactor to establish a direct drive, means including a control for said holding means, said control comprising pressure operable means responsive to the speed of said driven shaft to actuate said pressure operable means, means resiliently opposing operation of said pressure operable means, a source of power responsive to variations in the motor loads to cooperate with said actuating means, and operator controlled means to vary the resistance to movement of said pressure operable means by said actuating means.

4. A control for a change speed device connecting the drive and driven shaft of a motor driven machine, means to operate said control, said means including a movable member, means resiliently opposing movement of said member, detent means in control of said member, and fluid pressure delivery means responsive to the speed of said driven shaft to actuate said movable member against the influence of said resilient means, and means responsive to operating pressures of said motor to coact continuously with said fluid pressure delivery means in the actuation of said movable member.

5. A control for a change speed device connecting the drive and driven shaft of a motor driven machine having means to control the speed of the motor, means to operate said control, said means including a movable member, means resiliently opposing movement of said member, and fluid pressure delivery means responsive to the speed of said driven shaft to actuate said movable member against the influence of said resilient means, and means responsive to operating pressures of a motor to cooperate continuously with said fluid pressure delivery means in the actuation of said movable member, and operator controlled means operable with said means controlling the motor pressure to cooperate with said resilient means in opposing the actuation of said movable member.

6. The device of claim 4, in which the operating pressures of the internal combustion engine are the exhaust pressures.

7. The device of claim 9, in which the operating pressures of the internal combustion engine are the intake pressures.

8. A change speed device for use with a prime mover having a pressure lubricating system, said change speed device comprising a drive shaft, a driven shaft, a casing, means within said casing to connect said shafts at different ratios, means to actuate said connecting means, said actuating means including a fluid pressure operable control, a second casing, a conduit in communication with said lubricating system and said second casing, an impeller in said second casing, a second conduit in communication with said second casing and said pressure operable control, and means to admit fluid from said second casing to said first casing to avoid the influence of lubricating pressures on said pressure operable control.

9. A change speed device for use with a prime mover having a pressure lubricating system, said device comprising a drive shaft, a driven shaft, means to connect said shafts at different ratios, pressure actuated means to actuate said connecting means to establish desired ratios, a valve movable into predetermined positions to connect said pressure lubricating system separately to each of said pressure actuated means, and a pressure operated control for said valve, said control comprising an impeller mounted on said driven shaft, a casing for said impeller, means conducting fluid from said lubricating system to said casing, the pressure on said fluid increasing with increase in the speed of said driven shaft, and means delivering fluid under pressure from said impeller casing to said pressure operated control for said valve.

10. A change speed device for an internal combustion engine comprising a drive shaft, a driven shaft, means connecting said shafts to establish low and second ratios, said means including a reactor, and means to establish a direct drive between said shafts, including said reactor and a flywheel on said drive shaft, a member slidably carried by the flywheel, clutch plates carried by said reactor and by said flywheel member, means to hold said reactor against rotation, means effecting engagement of said plates comprising a lever pivotally mounted on said flywheel member, a piston slidable on said drive shaft to move said lever into clutch closing position, and means for sliding said piston including means conducting fluid under pressure from the pressure lubricating system of the engine to said piston.

JESSE W. HALE.